Feb. 27, 1968  W. P. BERRYMAN  3,371,214
READING HEAD WITH LIGHT SOURCE, ROTATING SHUTTER
AND SWITCHED PHOTOCELLS
Filed Jan. 29, 1964  2 Sheets-Sheet 1

INVENTOR
WALTER P. BERRYMAN
BY
Holcombe, Wetherill + Brisebois
ATTORNEYS

Feb. 27, 1968  W. P. BERRYMAN  3,371,214
READING HEAD WITH LIGHT SOURCE, ROTATING SHUTTER
AND SWITCHED PHOTOCELLS
Filed Jan. 29, 1964  2 Sheets-Sheet 2

INVENTOR
WALTER P. BERRYMAN
BY
Holcombe, Wetherill + Brisebois
ATTORNEYS

United States Patent Office 3,371,214
Patented Feb. 27, 1968

3,371,214
READING HEAD WITH LIGHT SOURCE, ROTATING SHUTTER AND SWITCHED PHOTOCELLS
Walter Pascoe Berryman, Bedford, England, assignor to George Richards & Company Limited, Altrincham, England, a company of Great Britain
Filed Jan. 29, 1964, Ser. No. 340,901
Claims priority, application Great Britain, Jan. 30, 1963, 3,893/63
12 Claims. (Cl. 250—233)

This invention relates to a reading head for detecting angular movements or positions accurately and one application is to the control of machine tools in which the angular position of a shaft may be required to be measured or the linear position of a member along a slide, movements of which can be arranged through gearing to produce angular movement of a shaft.

A system for detecting linear movement directly is the subject of U.S.A. Patent 3,122,686 but the present angular system is in some respects simpler than the linear system described there.

It is also contemplated that the invention will be useful in many cases where synchros have been used in the past. Synchros are not capable of operating at high speeds and they require physical contact between brushes and communtators but the present invention does not suffer from these disadvantages.

According to the present invention an angular reading head comprises a source of radiation, angularly movable shutter means arranged to establish a cyclically modulated pattern of the radiation, whose phase changes with shutter position, a number of detectors of the radiation respectively sensitive to the radiation pattern at phase displaced positions, and switching means for cyclically rendering the detectors sensitive and insensitive in turn.

In a preferred form of the invention the source of radiation comprises a lamp and the shutter means is a rotary disc or cylinder having alternate opaque and transparent portions arranged as the shutter rotates to cause each detector, which in this case comprises a photosensitive cell, to be cyclically illuminated with a varying intensity of illumination. While one cell has maximum illumination, another will have minimum illumination and two more may have average illumination, one increasing and one decreasing.

It will be appreciated that a small angular displacement of the shutter will change the intensity of illumination of all detectors and their outputs can be combined to produce a signal whose phase represents the angular position of the shutter. Thus the shutter can be driven directly or through gearing from the member whose position is to be detected.

The optical system can be simple and may consist of a number of lenses, one for each detector.

The pattern of radiation may be arranged to be modulated through its complete cycle in one revolution of the shutter or if higher accuracy is required, it may be arranged that one revolution of the shutter can modulate the radiation pattern through a number of cycles.

The shutter can be very light and quite small and it is contemplated that no difficulty will be experienced in rotating it at speeds up to perhaps 30,000 r.p.m. Moreover, there is no physical contact between the rotary shutter and the stationary lens, detector and switching system, other than through the bearings for the shutter member. In particular all the electrical components can be stationary.

Where a large number of revolutions of an input shaft are to be counted it may be arranged that a number of angular reading heads are geared to each other after the manner of the indicators on a gas meter so that the combination of the indications from all the heads can show the total angular movement of the input shaft. Alternatively separate means may be provided for counting shaft revolutions and the reading head can be used to give only the angular position within one revolution.

It is clear that the head may be used not only as a position detector but also as a position setter.

The invention also includes a lens arrangement for such an optical head and a method of making the lens arrangement.

Thus, according to another aspect of the invention the lens arrangement comprises a number of individual lenses, one for each detector, each with a cylindrical refracting surface. The individual lenses may be arranged side by side around the cylindrical shutter with their refracting surfaces which are towards the shutter lying on a cylinder concentric with the shutter.

The invention may be carried into practice in various ways and certain embodiments will now be described by way of example with reference to the accompanying drawings in which.

Figure 1:
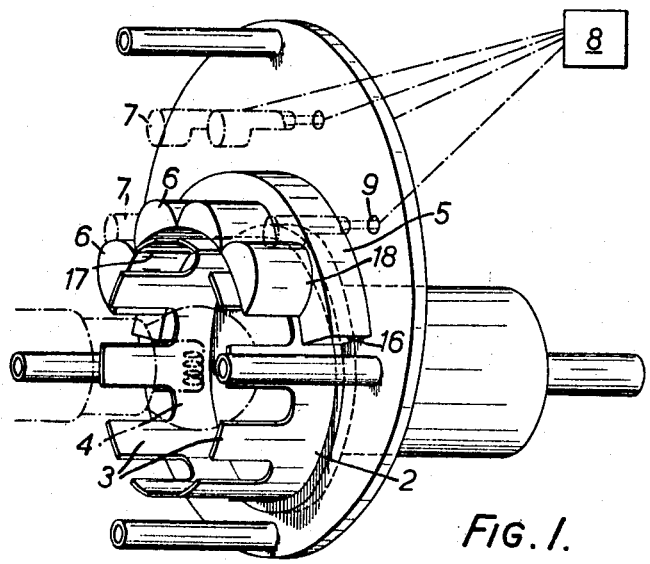
FIGURE 1 is a diagram of a perspective view of one angular reading head.

It is desired to measure the angular position of a shaft 1 which as suggested above might be driven from a member on a machine tool which is to be automatically controlled.

For this purpose the shaft 1 carries a cylindrical shutter 2 having a number of fingers 3 equally spaced around its periphery and positioned between a stationary electric light bulb 4 on the shaft axis and a stationary detector assembly 5.

The detector assembly includes a lens system consisting of four part-cylindrical lenses 6 each arranged to focus light from the lamp 4 on to a different one of four photocells 7. This position of the lenses and cells in relation to the width and pitch of the fingers 3 is such that at any position of the shutter, each of the cells 7 receives an intensity of illumination which is displaced in phase by 90° from the intensity of illumination expereinced by one of its fellows in the cyclic illumination pattern provided by the alternating bright parts corresponding to the gaps between the fingers and the dark parts corresponding to the fingers.

In fact, the arrangement is such that each cell goes through an illumination cycle of trapezium form, in which for a small angular movement it receives maximum illumination then for a further larger angular movement it receives steadily decreasing illumination, until for an equal small angular movement it receives minimum illumination, after which the illumination steadily increases to the maximum, thereby completing the cycle. The wave form could if preferred be arranged to be of triangular shape or could be more sinusoidal in shape.

The four photocells 7 are alternately switched on and off by switching mechanism 8 so that each is sensitive to the illumination falling on it for one half of the switching cycle. However, the instants when the four cells are switched on are displaced by 90° of the switching cycle from each other so that each cell 7 can be said to sample the illumination pattern at one position in the pattern for a different half of a switching cycle. The outputs from the cells are combined and the combined signal is passed through a suitable shaping circuit and then squared to give a square wave whose temporal phase represents the spatial phase of the illumination pattern and thus the angular position of the shutter. The method of switching the cells and processing their outputs is described in detail in U.S.A. Patent 3,122,686.

A small angular movement of the shaft can produce a usefully large linear movement of the shutter fingers, and it is found that the position of the shaft can be detected with high accuracy and in fact measurements to about six minutes of arc have been made. What is more, the angular position of the shaft can be followed by the electrical output even when the shutter is rotating at high speed.

Various devices may be employed for ensuring that the maximum illumination of each cell is the same and a preferred system has a small screw device 9 for moving the individual cells parallel with the shaft axis until this equal maximum illumination is achieved. In the embodiment about to be described with reference to FIGURE 3, the cells 7 are rotated about their axes to achieve this maximum illumination.

Figure 2:
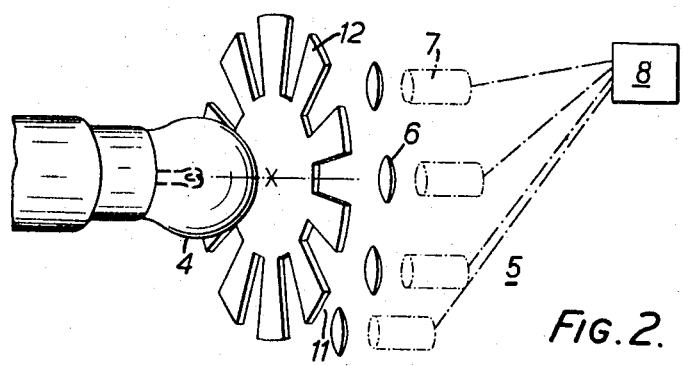
FIGURE 2 is a diagram similar to FIGURE 1 of an alternative form of reading head.

Then although a cylindrical shutter with axial fingers has been described, other forms of shutter will come to mind. For example, as shown in FIGURE 2 the shutter might comprise a disc 11 rotating about its principal axis with the fingers 12 extending radially from the axis, the source of light 4 and the detector assembly 5 being arranged on opposite sides of the disc.

Figure 3:
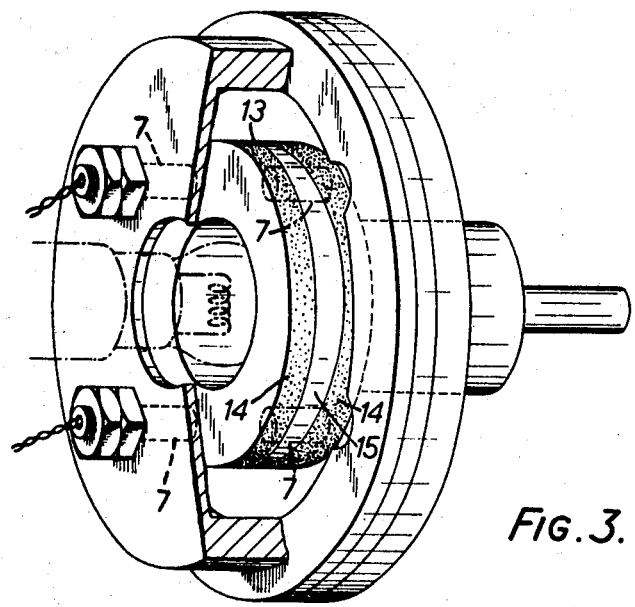
FIGURE 3 is a diagram similar to FIGURE 1 yet another angular reading head embodying the invention.

Again, as shown in FIGURE 3 a cylindrical type of shutter 13 could be used. This has dark and light portions 14 and 15 extending around its cylindrical surface in the manner of a screw thread so that in one revolution each cell 7 experiences one fully dark and one fully light period of illumination.

Although the system has been described as preferably an optical system, it is envisaged that an equivalent effect might be achieved if the source of radiation were electrostatic or electromagnetic. Thus the shutter might consist of a rotating conductor while the detectors are electrostatic pickups in capacitive relationship with the shutter.

A feature of the invention is the preferred form of lens system used for a cylindrical or drum type shutter described above for an optical system.

The four individual lenses 6 of FIGURE 1 are each part of one of four short lengths of cylindrical perspex rod which are individually secured to a segmental perspex support plate 16 with their axes parallel and arranged around the axis of rotation of the shutter each just in contact with its neighbours. Then the inner surfaces of the four assembled rod lengths are machined in a lathe so that all lie on a cylindrical surface 17 coaxial with the shutter. Thus each individual lens comprises an inner concave surface concentric with the axis and an outer convex surface 18 which is a part of the cylindrical surface of the original rod. If the angle subtended by the rod diameter at the axis differs from that subtended by the width of the fingers 3 by the required phase shift between detectors, this method of assembly ensures that the lenses are positioned to focus light at the appropriate phase displaced intensities on the four cells 7.

In the particular embodiment being described there are ten fingers 3 on the drum so that the illumination pattern goes through ten cycles for one revolution of the drum and with this arrangement, it is convenient to position the detector unit 5 opposite a small segment of the drum surface as shown in the FIGURE 1 although, of course, if it is preferred, each cell can be positioned to be sensitive to illumination from a different one of the ten cycles provided the phases are correctly related.

What I claim as my invention and desire to secure by Letters Patent is:

1. An angular reading head comprising a source of radiation, a single shutter means positioned adjacent the source to be angularly movable for establishing a cyclically modulated pattern of the radiation whose phase changes with shutter position, a number of detectors of the radiation respectively sensitive to the radiation pattern at phase-displaced positions, and switching means for cyclically rendering the detectors sensitive and insensitive in turn.

2. A reading head as claimed in claim 1 in which the source of radiation comprises a single lamp mounted on the axis of rotation of the shutter means for radiating light in all radial directions.

3. A reading head as claimed in claim 1 in which the shutter means is a rotary cylinder having alternate opaque and transparent portions, each transparent portion having an angular extent at least equal to the angular extent of the sensitive field of detection.

4. A reading head as claimed in claim 3 in which each detector comprises a photosensitive cell.

5. A reading head as claimed in claim 4 including an optical system comprising a number of lenses, one for each detector.

6. A reading head as claimed in claim 1 in which the shutter means is a rotary disc having alternate opaque and transparent portions.

7. A reading head as claimed in claim 5 in which the shutter is for modulating the pattern of radiation through a complete cycle in one revolution of the shutter.

8. A reading head as claimed in claim 5 in which the shutter is for modulating the radiation pattern through a number of complete cycles in one revolution of the shutter.

9. A reading head as claimed in claim 1 in which the shutter is mounted in rotary bearings, and in which the only physical contact between the shutter on the one hand, and the lens, detector, and switching system on the other is through the bearings.

10. A reading head as claimed in claim 1 in which all the electrical components are stationary.

11. An input shaft and an arrangement for measuring revolutions of the input shaft including a number of angular reading heads each as claimed in claim 1, gear means interconnecting the heads for driving them at graded speeds and means for indicating a combination of the indications from all the heads showing the total angular movement of the input shaft.

12. An input shaft and an arrangement for measuring revolutions of the input shaft, including an angular reading head as claimed in claim 1 for indicating the angular position of the shaft within one revolution, and a counter for counting complete revolutions of the input shaft.

References Cited

UNITED STATES PATENTS

| | | | |
|---|---|---|---|
| 3,096,444 | 7/1963 | Seward | 250—231 |
| 3,122,686 | 2/1964 | Davies et al. | 250—237 |

RALPH G. NILSON, *Primary Examiner.*

M. ABRAMSON, *Assistant Examiner.*